United States Patent [19]

Ahola

[11] Patent Number: 5,756,958
[45] Date of Patent: May 26, 1998

[54] ASSEMBLY FOR A POWDER FILLER MATERIAL FEED SYSTEM

[75] Inventor: Tom Ahola, Klaukkala, Finland

[73] Assignee: Rotaweld Oy, Klaukkala, Finland

[21] Appl. No.: 836,076

[22] PCT Filed: Oct. 23, 1995

[86] PCT No.: PCT/FI95/00582

§ 371 Date: May 1, 1997

§ 102(e) Date: May 1, 1997

[87] PCT Pub. No.: WO96/14184

PCT Pub. Date: May 17, 1996

[30] Foreign Application Priority Data

Nov. 3, 1994 [FI] Finland ................................. 945176

[51] Int. Cl.$^6$ ......................................................... B23K 10/00
[52] U.S. Cl. ........................... 217/121.47; 219/76.16; 219/121.45; 219/121.51
[58] Field of Search ......................... 219/121.47, 76.15, 219/76.16, 121.59, 121.51, 121.48, 75, 74, 121.46, 121.45

[56] References Cited

U.S. PATENT DOCUMENTS 2,851,581 9/1958 Libby .................................. 219/74

5,637,242 6/1997 Muehlberger ................ 219/121.47

FOREIGN PATENT DOCUMENTS 4129239 3/1993 Germany.
2173715 10/1986 United Kingdom.

*Primary Examiner*—Mark H. Paschall
*Attorney, Agent, or Firm*—Smith-Hill and Bedell

[57] ABSTRACT

Pressure loss in a feed channel of a powder filler material feed system of a plasma welding apparatus is compensated using an adapter body having a connection for taking shielding gas into the inside of the adapter body, a connection for feeding the powder filler material into the adapter body and therein into the shielding gas flow, and a connection for taking the mixture of the shielding gas and the powder filler material from the adapter body into a feed channel of the welding cable. The adapter body is formed with a channel section which flares in the direction of the shielding gas flow, and the connection for taking the shielding gas into the adapter body incorporates an injector nozzle insert having its discharge end adapted to exit into the start end of the flaring flow channel.

14 Claims, 1 Drawing Sheet

5,756,958

ASSEMBLY FOR A POWDER FILLER MATERIAL FEED SYSTEM

The present invention relates to an assembly for use in the powder filler material feed system of plasma or laser welding equipment, for instance.

Plasma welding is advantageously carried out using powder filler material in a plurality of welding tasks and particularly in automated welding systems in which the feed of the filler material is otherwise difficult to arrange. Powder filler material has been used for a long time in plasma surfacing and the technology of such equipment is already rather reliable and conventional. Relatively large amounts of powder are consumed in the surfacing process and powder feed to the point being surfaced can be easily arranged with the help of an inert carrier gas, because the feed can be implemented using hoses having a large diameter and usually a short length combined with a high flow rate of the inert gas and the powder. Powder consumption in surfacing may be up to hundreds of grams per minute. In joint welding by a plasma arc, the powder feed rate is very small, typically approx. 15 g/min or even less. The greatest consumption of powder occurs in the fill weldment of a V-butt joint, whereby powder consumption may rise up to 20–50 g/min. As the welding speed with concurrent plasma welding equipment may be as high as 5 m/min, obviously an extremely accurate dosing of filler material into the weldment must be arranged.

The greatest difficulties in powder feed are encountered in feeding the powder to the weld pool via a long and thin channel located inside the welding cable. The diameter of the feed channel in the order of a few millimeters, e.g., 3.5 mm, and the flow resistance of the channel must be overcome by applying a pressure differential between the ends of the powder carrier gas channel inside the cable. Presently, powder-form filler material can be fed over cable lengths of 4 to 5 meters, whereby the required pressure head at the powder entry point into the feed channel is approx. 100–150 mbar. To make the powder flow smoothly through kinks in the welding cable, the carrier gas velocity must be approx. 20 m/s, whereby the powder transfer speed is 5 m/s. In plasma equipment for joint weldments, the volumetric rate of carrier gas required to transfer the powder is approx. 4–5 l/min. A sufficiently high velocity of the powder flow is crucial, because after the plasma arc has been ignited, powder feed into the plasma arc must be commenced rapidly to enable starting the welding without delay. The above-given figures are only exemplifying values for a typical operating environment and subject to variation depending on the dimensions of the welding cable and the actual application. Besides in plasma welding, the same method of powder filler material feed is also employed in laser welding, for instance.

The greatest problem in feeding a powder-form filler material is pulsation of the feed flow which may be related to a number of different reasons. Because of the powder feed via a narrow and bent channel and that the volumetric flow rates of the carrier gas and the powder remain small, the powder tends to accumulate in the bends of the feed channel thus causing pulsation on the flow velocity. Such pulsation of the powder feed flow further causes pulsation of the carrier gas inlet pressure thus degrading the situation. Another factor hindering a steady flow of the powder is the reflection of such pressure pulsations backward via the feed arrangement into the powder hopper. These pressure pulsations promote the flow of the powder from the hopper and also causes bridging of powder to collapse, thus introducing a transient powder pulse of several grams into the feed channel, whereby a weldment defect results and the powder feed rate undergoes a short-term disturbance until the feed system again assumes steady-state operation.

Conventional powder feed assemblies aim at alleviating powder feed problems by using the shortest welding cables possible, whereby the feed channel length is minimized. The channel diameter is made as large as possible and the feed channel infeed point is placed higher than the point to be welded, whereby the cable bends are minimized and the powder accumulation risk is reduced. However, such a wide-diameter feed channel requires a carrier gas flow of high volumetric rate and the powder transfer speed may become excessively high, whereby difficulties will arise in introducing the powder into the weld pool. Additionally, the carrier gas flow exiting the torch at an excessively high volumetric rate and velocity causes turbulence at the welding point, which results in reduced shielding effect of the inert gas and reduced weld quality, even weldment defects. As the shielding gas conventionally is argon, a strong incentive exists for minimizing the welding inert gas consumption. In automated welding, maximally long welding cables are preferred as this gives the welding automat a wider operating range.

Attempts have been made to prevent the entry of pressure pulsations into the powder hopper by way of pressurizing the powder hopper to the same pressure level with the powder infeed point into the feed channel. This approach has been effective in reducing pressure pulsations. However, even such arrangements permit inert gas entry into the powder hopper particularly when starting the welding operation, whereby an uncontrolled transient of powder feed past the feed assembly into the feed channel occurs. Also the accumulation of powder during welding in the feed channel may give rise to pressure pulsations. Conventionally, pressure equalization is accomplished by means of a relatively complex piping arrangement aiming at pressure equalization between the pressure of the inert gas used as the powder carrier and the powder hopper pressure. One of the shortcomings of this embodiment is the large number of easily leaking connections and a complicated structure of the assembly. Through leaky connections a carrier gas leak may develop into the powder hopper, whereby powder feed pulsation and resulting weldment defects will occur anyhow. These problems are encountered also when the amount of powder in the hopper varies.

Moreover, the powder hopper must be pressure-tight. This causes substantial problems as the powders must be stored in air-tight packages to prevent deterioration by ambient air and humidity. Due to such pressure- and air-tightness requirements, powders are stored in tightly sealed metal containers that are connected for use to the powder feed assembly. Such a packaging method is extremely expensive and pressure-tight connection of the powder containers to the feed assembly is clumsy.

It is an object of the present invention to provide an assembly capable of eliminating powder feed disturbances in plasma welding equipment and similar apparatuses.

The goal of the invention is achieved by means of adapting an injector nozzle insert and a flaring tube section at the powder feed point into the feed channel.

The invention offers significant benefits.

By virtue of the invention, the pressure at the powder feed point into the feed channel can be equalized to atmospheric pressure, whereby the static pressure prevailing in the feed channel is prevented from entering the powder hopper. Also the pressure transients of the feed channel are isolated from reaching the powder hopper, thus resulting in steady and accurate dosing of the powder as its flow into the dosing device occurs in a stable manner. No complicated pressure equalization systems are required and a particular benefit is gained in that the powder hopper need not be pressurized. The powder filler material may be delivered packaged in low-cost plastic foil bags whose connection to the feed assembly can be arranged in a simple manner based on piercing the bag wall by a tipped connector of the dosing device. This facility simplifies the use of the feed assembly and offers appreciable reduction of packaging and storage costs. The structure of the feed assembly becomes extremely simple with no difficult-to-seal connections. The powder feed will be free from disturbing pulsation at the start of powder feed and the powder flow will rapidly stabilize at the preset level. This property is particularly advantageous in automated welding as the powder/carrier gas flow can be cut off when the plasma arc is extinguished. Accordingly, significant savings in the shielding gas consumption can be attained.

In the following the invention will be described in greater detail with reference to the appended drawings in which

DETAILED DESCRIPTION OF THE DRAWINGS

Figure 1:
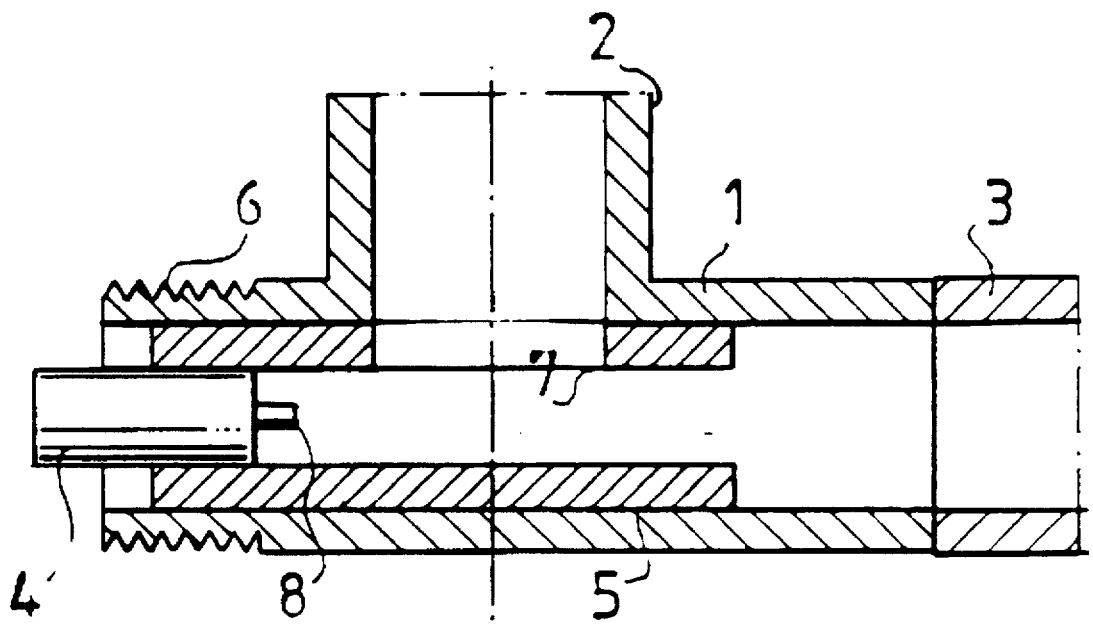
FIG. 1 is a longitudinally sectioned side view of an embodiment of the invention.

As shown in FIG. 1, the assembly according to the invention can be incorporated in an adapter in which the powder flow is mixed with the carrier gas flow. Such an adapter comprises a T-shaped body piece 1 which is connected to the welding cable 3, and more specifically, to the feed channel 3 of the powder filler material and the shielding gas. The adapter has an infeed connection 4, 6, 8 of the shielding gas arranged to its other side, opposite to the feed channel 3. The powder filler material is taken into the adapter via a connection 2 arranged orthogonal to the straight flow channel of the adapter. At the powder infeed connection 2, a bushing 5 is arranged into the straight flow channel of the adapter, whereby the inner diameter of the bushing is smaller than the inner diameter of the feed channel 3. The end of the bushing 5 is located in the zone remaining between the powder infeed connection 2 and the inlet end of the feed channel 3. At the powder infeed connection 2, the bushing 5 has an opening 7 with a diameter equal to that of the connection. The shielding gas and the powder are mixed with each other within the mixing zone formed by the bushing 5. The shielding gas connection is comprised of a connection insert 4 adapted inside the bushing 5, said insert having a small-diameter injector nozzle 8 fitted in its center, and of an outer thread machined to the adapter body 1. When putting the assembly in use, the gas hose is pushed onto the connection insert 4 and the hose is secured by rotating its locking nut onto the thread 6 of the adapter body 1.

The shielding gas flows into the adapter 1 and therefrom further into the feed channel 3 via the injector nozzle 8. On the path of the shielding gas flow, the end of the injector nozzle 8 is situated in front of the powder connection opening 7. The flows of the shielding gas and the powder in the adapter occur as follows. The shielding gas enters the adapter via the small-diameter bore of the injector nozzle 8 into the bushing 5 just in front of the powder infeed connection. The gas discharging from the injector nozzle 8 blows the powder entering the mixing zone from the powder infeed connection 2 forward (to the right of FIG. 1) within the bushing 5, until the bushing 5 ends after the powder infeed connection in the direction of the powder/gas flow and the flow channel thus assumes the full diameter of the feed channel 3. As the flow channel diameter increases, the pressure drops correspondingly, and with a suitable dimensioning of the flow channel, the pressure at the powder infeed connection can be made equal to atmospheric pressure, whereby pressure pulsations are not reflected from the feed channel 3 backward into the powder infeed connection 2.

The design of the feed channel is dictated, among other factors, by the shielding gas pressure and the dimensions of the feed channel. The following guideline design values are exemplifying for a welding cable of approx. 5 m length using a shielding gas pressure of approx. 3.4 bar. The feed channel inner diameter is 3.5 mm for the length running inside the welding cable, whereby the feed assembly can be dimensioned as follows. The bushing 5 has an inner diameter of 2.5 mm and the injector nozzle insert 8 has an inner diameter of 0.55 mm. The nozzle tip of the injector nozzle insert 8 is located approx. 4.8 mm from the center of the powder infeed connection 2 and the bore diameter of the powder infeed connection 2 is approx. 4 mm. The most important factors in the dimensioning of the flow channel are the proper diameter of the bushing 5 and the correct placement of its end so that the dynamic pressure at the powder infeed connection is adjusted to atmospheric pressure or slightly above.

Hence, the gauge pressure at this point should be in the range 0–10 mbar. At a pressure lower than this, the venturi effect causes underpressure in the powder hopper resulting in powder agitation in the hopper and even disturbance in the feed rate. At pressures above this range, shielding gas can enter the hopper, whereby the operation will be hampered by the same problems as those plaguing conventional feed arrangements. In a properly dimensioned feed assembly, the powder infeed point to the mixing zone is tuned to the node of a standing wave having the same pressure as atmospheric pressure.

Figure 2:
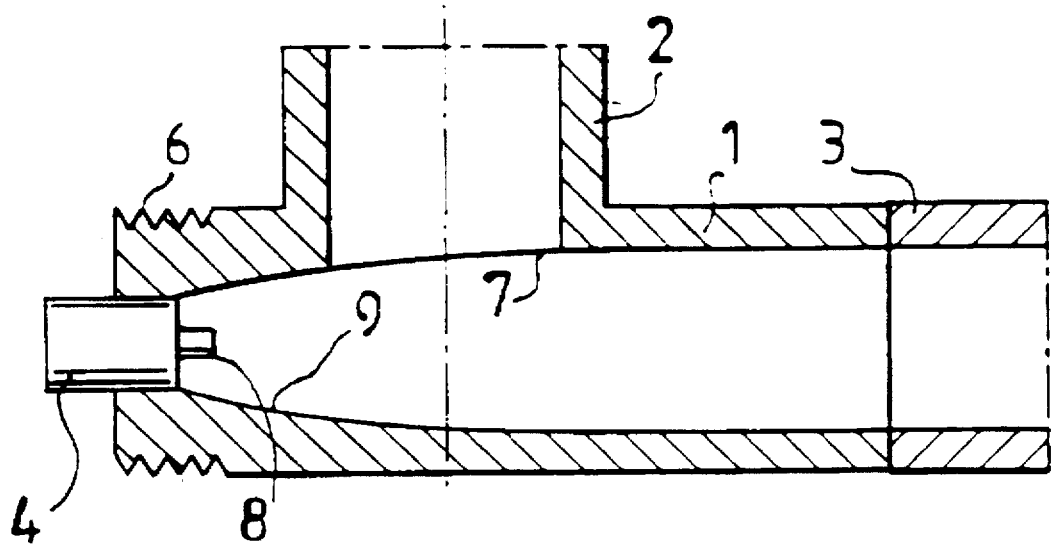
FIG. 2 is a longitudinally sectioned side view of another embodiment of the invention.

Referring to FIG. 2, another embodiment of the invention is shown therein.

In this assembly the straight bushing is replaced by a venturi section fabricated at the inside of the adapter. The cone of the venturi section 9 starts in front of the powder infeed connection 2 on the path of the shielding gas flow and flares toward the feed channel diameter so that the venturi section inner diameter becomes equal to the feed channel diameter after the powder infeed connection. The effect of the venturi section on the shielding gas pressure is more drastic than that of the stepped feed channel, whereby the flared embodiment is suited for use when a heavy flow resistance in the flow channel of the welding cable and a large pressure differential must be compensated for. However, the venturi section should not be dimensioned to achieve too strong a venturi effect since otherwise a negative pressure will occur at the powder infeed point. The venturi section can be basically dimensioned on the same grounds as the stepped channel, while the more powerful effect of the venturi section, an injector nozzle with larger diameter bore can be used.

Besides the stepped-diameter channel and the venturi channel, also a linearly flaring conical channel or any other suitable cross section of the flow channel is feasible. However, the embodiment illustrated in FIG. 1 is relatively easy to manufacture and gives good compensation of the feed channel overpressure. The bushing 5 may be a separate insert placed inside the adapter body, or alternatively, its shape can be machined directly to the adapter body. The adapter 1 may be aligned downward slanting or even vertical to prevent powder accumulation inside the adapter in any condition. The powder infeed connection can be aligned in a slanted position relative to the adapter body, and it is even possible to feed the powder into the inside of the adapter from behind and about the injector insert. At least in the latter case the adapter must be slightly tilted make the powder to flow into the flow of shielding gas. In the embodiments illustrated in FIGS. 1 and 2, the injector insert is shown extending for a defined length from the starting end of the slightly flaring flow channel. However, such a design is not essential to the spirit of the invention, and in fact, the injector insert end can be designed to be flush with the starting end of the flow channel.

In the above description the powder is assumed to be carried to the point of use in the feed channel along with the shielding gas. Also other channels can be used for taking the shielding gas to the point of use, and besides the shielding gas flow acting as the carrier gas for the powder, additional shielding gas can be taken to the point of use via other channels. Besides inert gases, other shielding gases such as carbon dioxide may be used as the carrier gas.

I claim:

1. An assembly for compensating the pressure loss in a feed channel of a powder filler material feed system of a plasma welding apparatus, the assembly comprising an adapter body incorporating at least one connection for taking shielding gas into the inside of the adapter body, one connection for feeding the powder filler material into the adapter body and therein into the shielding gas flow to form a mixture therewith, and one connection for taking the mixture of the shielding gas and the powder filler material from the adapter body into a feed channel of the welding cable, characterized in that to the adapter body is formed a channel section having a flaring diameter in the direction of the shielding gas flow, and the connection for taking the shielding gas into the adapter body incorporates an injector nozzle insert having its discharge end adapted to exit into the start end of the flaring flow channel.

2. An assembly as defined in claim 1, characterized in that, on the path of the shielding gas flow, the opening of the powder filler material infeed channel is situated after the end of the injector nozzle insert.

3. An assembly as defined in claim 1, characterized in that the assembly comprises, arranged to the inside of the adapter body, a straight channel section with a diameter smaller than that of the feed channel, said channel section having to its one end adapted the injector nozzle insert and ending after the powder filler material infeed connection in the flow direction of the shielding gas.

4. An assembly as defined in claim 1, characterized in that the assembly comprises, arranged to the inside of the adapter body, a venturi channel section having to its one end adapted the injector nozzle insert and ending after the powder filler material infeed connection in the flow direction of the shielding gas.

5. An assembly as defined in claim 1, characterized in that the powder filler material infeed connection is aligned slanted relative to the adapter body.

6. An assembly as defined in claim 5, characterized in that the end of the injection nozzle insert is situated after the powder filler material infeed connection in the flow direction of the shielding gas.

7. An assembly for compensating for pressure loss in a feed channel of a powder filler material feed system of a plasma welding apparatus, the assembly comprising an adapter body having at least a first connection for feeding shielding gas into the inside of the adapter body, a second connection for feeding the powder filler material into the adapter body and adding the powder filler material to the shielding gas flow to form a mixture therewith, and a third connection for exhausting the mixture of the shielding gas and the powder filler material from the adapter body, wherein the adapter body defines a flow passage extending from the first connection toward the third connection, said flow passage having a segment with a cross-sectional area which increases monotonically in the direction of the shielding gas flow from a narrower end toward a wider end, and the first connection incorporates an injector nozzle insert having its discharge end adapted to exit into the narrower end of said segment of the flow passage.

8. An assembly as defined in claim 7, wherein said segment of the flow passage flares from its narrower end toward its wider end.

9. An assembly according to claim 7, wherein the cross-sectional area of the flow passage increases stepwise between the narrower end and the wider end of said segment.

10. An assembly as defined in claim 7, wherein the second connection body opens into the flow passage downstream of the injector nozzle insert.

11. An assembly as defined in claim 7, including a straight channel section fitted inside the adapter body, said straight channel section having the injector nozzle insert fitted in one end thereof and extending downstream of the second connection.

12. An assembly as defined in claim 7, wherein the injector nozzle insert is fitted in the adapter body at one end of the venturi section and the venturi channel section ends downstream of the second connection.

13. An assembly as defined in claim 7, wherein the second connection is slanted relative to the adapter body.

14. An assembly as defined in claim 13, wherein the end of the injection nozzle insert is situated downstream of the second connection relative to the flow direction of shielding gas.

* * * * *